(12) United States Patent
Ikeda

(10) Patent No.: US 9,273,599 B2
(45) Date of Patent: Mar. 1, 2016

(54) INTERNAL COMBUSTION ENGINE

(75) Inventor: Yuji Ikeda, Kobe (JP)

(73) Assignee: IMAGINEERING, INC., Kobe-shi (JP)

( * ) Notice: Subject to any disclaimer, the term of this patent is extended or adjusted under 35 U.S.C. 154(b) by 0 days.

(21) Appl. No.: 13/982,577

(22) PCT Filed: Feb. 15, 2012

(86) PCT No.: PCT/JP2012/053516
§ 371 (c)(1),
(2), (4) Date: Oct. 3, 2013

(87) PCT Pub. No.: WO2012/111701
PCT Pub. Date: Aug. 23, 2012

(65) Prior Publication Data
US 2014/0014050 A1    Jan. 16, 2014

(30) Foreign Application Priority Data

Feb. 15, 2011 (JP) ................................. 2011-030042

(51) Int. Cl.
*F02B 25/04* (2006.01)
*F02B 43/00* (2006.01)
(Continued)

(52) U.S. Cl.
CPC ............... *F02B 43/00* (2013.01); *F02P 9/007* (2013.01); *F02P 15/08* (2013.01); *F02P 23/045* (2013.01); *F02P 3/0407* (2013.01); *F02P 7/02* (2013.01); *F02P 11/00* (2013.01); *F02P 15/04* (2013.01)

(58) Field of Classification Search
CPC ......... F02P 23/045; F02P 23/04; F02P 13/00; F02M 27/042; F02M 57/005; F02M 57/06; H05H 1/46; H05H 1/24; F02D 35/027; F02B 77/085
USPC ...................................... 123/2, 3, 536, 143 B
See application file for complete search history.

(56) References Cited

U.S. PATENT DOCUMENTS

| 4,332,223 A | * | 6/1982 | Dalton | .................. F02B 19/108 123/143 B |
| 4,499,872 A | * | 2/1985 | Ward | ...................... F02B 23/08 123/344 |

(Continued)

FOREIGN PATENT DOCUMENTS

| JP | 62-223411 A | 10/1987 |
| JP | 2007-113570 A | 5/2007 |
| JP | 2010-37947 A | 2/2010 |

OTHER PUBLICATIONS

International Search Report for PCT/JP2012/053516, Mailing Date of Aug. 7, 2012.

*Primary Examiner* — Marguerite McMahon
*Assistant Examiner* — Tea Holbrook
(74) *Attorney, Agent, or Firm* — Westerman, Hattori, Daniels & Adrian, LLP

(57) ABSTRACT

To effectively improve flame propagation speed utilizing active species in an internal combustion engine 10 that promotes combustion utilizing active species. The internal combustion engine 10 is provided with an internal combustion engine main body 11 that combusts fuel air mixture in a combustion chamber 20 and an active species generation unit 13 that generates active species in a region which a flame surface has not yet reached during flame propagation in the combustion chamber 20. In a region which the flame will eventually pass through, the active species generation unit 13 generates the active species while the flame surface has not yet reached the region.

4 Claims, 12 Drawing Sheets

(51) Int. Cl.
  *F02P 9/00* (2006.01)
  *F02P 15/08* (2006.01)
  *F02P 23/04* (2006.01)
  *F02P 3/04* (2006.01)
  *F02P 7/02* (2006.01)
  *F02P 11/00* (2006.01)
  *F02P 15/04* (2006.01)

(56) References Cited

U.S. PATENT DOCUMENTS

| | | | |
|---|---|---|---|
| 4,561,406 A * | 12/1985 | Ward | F02B 23/08 123/143 B |
| 4,774,914 A * | 10/1988 | Ward | F02P 23/045 123/162 |
| 8,186,322 B2 * | 5/2012 | Ikeda | B01D 53/32 123/143 B |
| 8,240,293 B2 | 8/2012 | Ikeda | |
| 2009/0229581 A1 | 9/2009 | Ikeda | |
| 2010/0132666 A1 * | 6/2010 | Sato | H01T 13/50 123/406.19 |
| 2010/0209335 A1 * | 8/2010 | Mills | 423/648.1 |
| 2011/0030660 A1 * | 2/2011 | Ikeda | F02B 1/02 123/536 |
| 2011/0031886 A1 * | 2/2011 | Ikeda | F01L 3/02 315/111.21 |

* cited by examiner

INTERNAL COMBUSTION ENGINE

TECHNICAL FIELD

The present invention relates to an internal combustion engine that promotes combustion utilizing active species.

BACKGROUND ART

Conventionally, there is known a technology of promoting combustion utilizing active species such as OH radical. For example, Japanese Unexamined Patent Application, Publication No. 2007-113570 discloses an ignition device employing a technology of this kind. The ignition device disclosed by Japanese Unexamined Patent Application, Publication No. 2007-113570 is provided in an internal combustion engine such as a gasoline engine. In this ignition device, fuel air mixture that has been ignited is irradiated with a microwave so as to cause plasma discharge, increase radical concentration, and promote flame propagation.

THE DISCLOSURE OF THE INVENTION

Problems to be Solved by the Invention

In a conventional internal combustion engine, no consideration has been given to a location and timing at which the active species are to be generated in a combustion chamber during a flame propagation. The present invention has been made in view of the above described problems, and it is an object of the present invention to effectively improve a flame propagation speed utilizing active species in an internal combustion engine that promotes combustion utilizing active species.

Means for Solving the Problems

In accordance with a first aspect of the present invention, there is provided an internal combustion engine including: an internal combustion engine main body that combusts fuel air mixture in a combustion chamber; and an active species generation unit that generates active species in a region which a flame surface has not yet reached during flame propagation in the combustion chamber.

According to the first aspect of the present invention, during the flame propagation in the combustion chamber, the active species are generated in a region, which the flame will eventually pass through, while the flame surface has not yet reached the region. Accordingly, while the flame surface passes through the region, in which the active species are generated, oxidation reaction in the flame surface is promoted owing to the active species, and the flame propagation speed is increased. According to the first aspect of the present invention, the active species directly promote the oxidation reaction in the flame surface.

In accordance with a second aspect of the present invention, in addition to the first aspect of the present invention, the active species generation unit generates active species by generating plasma in the region which the flame surface has not yet reached.

In accordance with a third aspect of the present invention, in addition to the first or second aspect of the present invention, in a region, in which occurrence frequency of knocking is relatively high in the combustion chamber, the active species generation unit generates active species while the flame surface has not yet reached the region.

According to the third aspect of the present invention, in a region, in which occurrence frequency of knocking is relatively high in the combustion chamber, the active species are generated while the flame surface has not yet reached the region. When knocking is caused, the flame surface slows down before the flame surface reaches a region, in which knocking is to be caused, and thus knocking occurs. According to the third aspect of the present invention, the active species are generated in the region where knocking is likely to be caused. Therefore, slowdown of the flame surface is suppressed.

In accordance with a fourth aspect of the present invention, in addition to the third aspect of the present invention, the internal combustion engine includes a knocking detection unit that detects an occurrence of knocking in the combustion chamber, and, in a case in which the knocking detection unit detects an occurrence of knocking, in the region in which occurrence frequency of knocking is relatively high in the combustion chamber, the active species generation unit generates the active species while the flame surface has not yet reached the region.

According to the fourth aspect of the present invention, in the case in which it is detected that knocking has occurred, in the region where occurrence frequency of knocking is relatively high, the active species are generated while the flame surface has not yet reached the region. Accordingly, during a combustion cycle immediately after knocking has occurred, slowdown of the flame surface is suppressed before the flame surface reaches the region where knocking has occurred.

In accordance with a fifth aspect of the present invention, in addition to the first or second aspect of the present invention, the internal combustion engine main body is configured such that a piston reciprocates in a cylindrical shaped cylinder, and is adapted to ignite the fuel air mixture at a central part of the combustion chamber in the cylinder, while, within a space located outside of the central part in the combustion chamber, the active species generation unit generates the active species in a region, to which the flame surface reaches in a relatively late timing, while the flame surface has not yet reached the region.

According to the fifth aspect of the present invention, in a region, to which the flame surface reaches in a relatively late timing, within a space located outside of the central part in the combustion chamber, the active species are generated while the flame surface has not yet reached the region. Accordingly, it is possible to promote oxidation reaction of the flame surface that passes through the region, to which the flame surface reaches in a relatively late timing, thereby making it possible to increase the flame propagation speed.

In accordance with a sixth aspect of the present invention, in addition to the second aspect of the present invention, the active species generation unit includes an electromagnetic wave oscillator that oscillates an electromagnetic wave, and an antenna for emitting the electromagnetic wave supplied from the electromagnetic wave oscillator to the combustion chamber, and is adapted to generate electromagnetic wave plasma byway of the electromagnetic wave emitted from the antenna in the region which the flame surface has not yet reached.

According to the sixth aspect of the present invention, the active species generation unit generates the electromagnetic wave plasma in the region which the flame surface has not yet reached by emitting the electromagnetic wave to the region.

In accordance with a seventh aspect of the present invention, in addition to the sixth aspect of the present invention, the internal combustion engine main body is configured such that a piston reciprocates in a cylindrical shaped cylinder, and is adapted to ignite the fuel air mixture at a central part of the combustion chamber in the cylinder, while, the antenna extends along an outer peripheral part of the combustion chamber, the internal combustion engine includes a knock region detection unit that detects a region where knocking has occurred, in a case in which knocking has occurred in the combustion chamber, and the active species generation unit includes an electric field adjuster that changes a location of a strong electric field region, which has an electric field relatively strong in intensity, on a surface of the antenna, and is adapted to adjust the electric field adjuster on the basis of a detection result of the knock region detection unit so as to generate electromagnetic wave plasma in or in the vicinity of the region where knocking has occurred.

According to the seventh aspect of the present invention, the knock region detection unit detects the region where knocking has occurred. The electric field adjuster adjusts a location of the strong electric field region so that the electromagnetic wave plasma is generated in or in the vicinity of the region where knocking has occurred. According to the seventh aspect of the present invention, it is possible to generate the electromagnetic wave plasma in or in the vicinity of a region where knocking has occurred with a small number of antennae even if the region may extend over a wide area to a certain degree.

Effect of the Invention

According to the present invention, since the active species directly promote oxidation reaction in the flame surface, it is possible to effectively improve the flame propagation speed utilizing the active species.

Furthermore, according to the third aspect of the present invention, it is possible to suppress a decrease in the speed of the flame surface before the flame surface reaches the region where knocking is likely to be caused. Accordingly, since it is possible to cause the flame to reach the region where knocking is likely to be caused while knocking has not yet occurred, it is possible to suppress an occurrence of knocking.

Furthermore, according to the fourth aspect of the present invention, during a combustion cycle immediately after knocking has occurred, it is possible to suppress a decrease in the speed of the flame surface before the flame surface reaches the region where knocking has occurred. Accordingly, it is possible to suppress a consecutive occurrence of knocking.

Furthermore, according to the fifth aspect of the present invention, it is possible to promote oxidation reaction of the flame surface that passes through the region, to which the flame surface reaches in a relatively late timing, thereby making it possible to increase the flame propagation speed. Accordingly, it is possible to ensure a uniform diffusion state of the flame in the combustion chamber, seen from the central part of the combustion chamber.

Furthermore, according to the seventh aspect of the present invention, in a case in which the electromagnetic wave plasma is to be generated in or in the vicinity of a region where knocking has occurred, it is possible to generate the electromagnetic wave plasma with a small number of antennae even if the region may extend over a wide area to a certain degree.

BEST MODE FOR CARRYING OUT THE INVENTION

Figure 1:
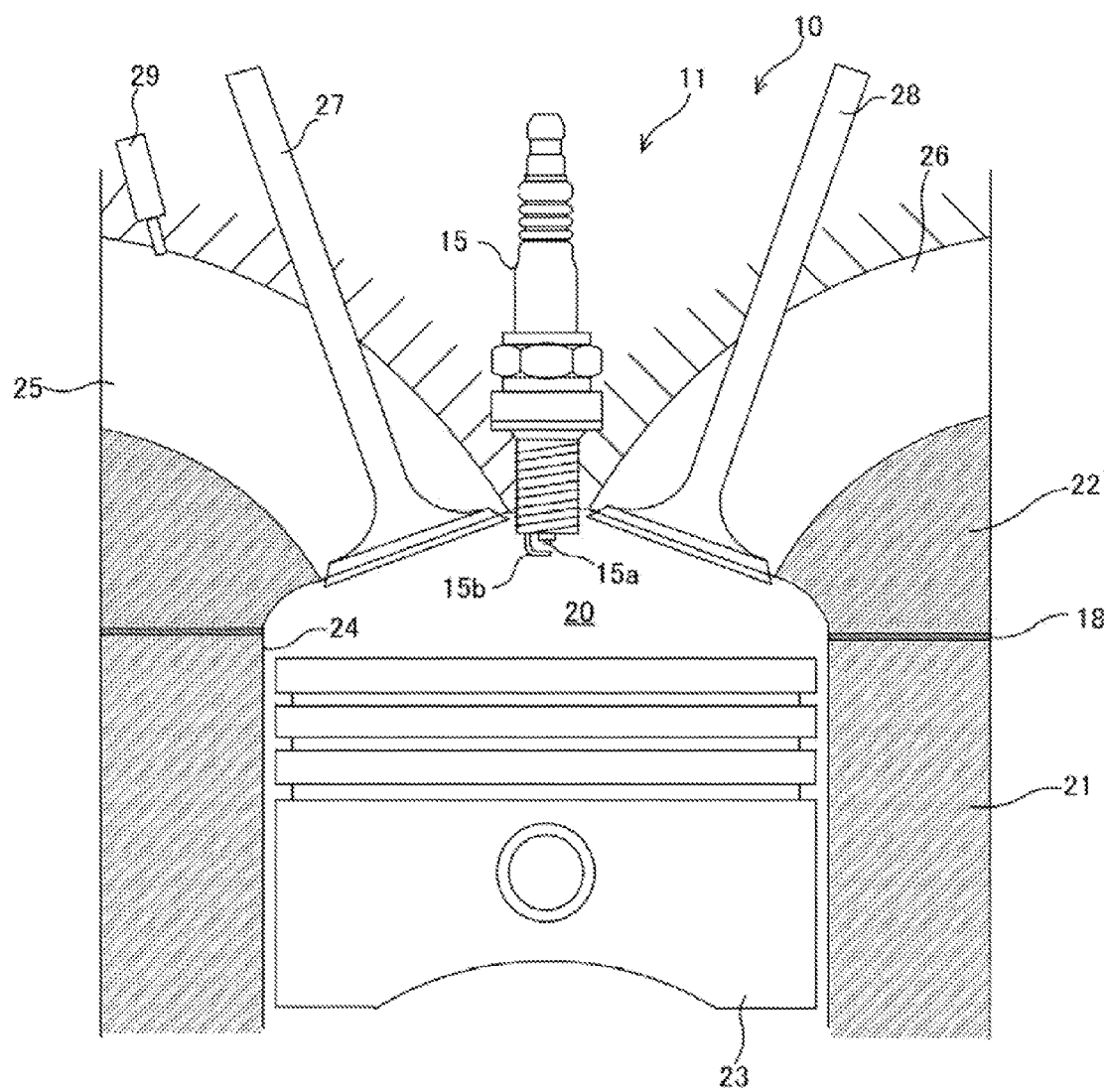
FIG. 1 is a schematic configuration diagram of an internal combustion engine according to an embodiment.

In the following, a detailed description will be given of the embodiment of the present invention with reference to drawings. It should be noted that the following embodiment is a mere example that is essentially preferable, and is not intended to limit the scope of the present invention, applied field thereof, or application thereof.

Embodiment

The present embodiment is directed to an internal combustion engine 10 including an electromagnetic wave emission device 13 that emits an electromagnetic wave to a combustion chamber 20. The internal combustion engine 10 is a reciprocating type engine in which a piston 23 reciprocates. The internal combustion engine 10 is provided with an internal combustion engine main body 11, a discharge device 12, and the electromagnetic wave emission device 13. The internal combustion engine 10 is controlled by an electronic control device 30 (ECU).

<Internal Combustion Engine Main Body>

As shown in FIG. 1, the internal combustion engine main body 11 is provided with a cylinder block 21, a cylinder head 22, and the pistons 23. The cylinder block 21 is formed with a plurality of cylinders 24 each having a circular cross section. Inside of each cylinder 24, the piston 23 is reciprocatably mounted. The piston 23 is connected to a crankshaft (not shown) via a connecting rod (not shown). The crankshaft is rotatably supported by the cylinder block 21. While the piston 23 reciprocates in each cylinder 24 in an axial direction of the cylinder 24, the connecting rod converts the reciprocation movement of the piston 23 into rotation movement of the crankshaft.

The cylinder head 22 is placed on the cylinder block 21, and a gasket 18 intervenes between the cylinder block 21 and the cylinder head 22. The cylinder head 22 partitions the combustion chamber 20 along with the cylinder 24 and the piston 23.

The cylinder head 22 is provided with one spark plug 15 for each cylinder 24. The spark plug 15 is attached to the cylinder head 22 so that a discharge gap between a central electrode 15a and a ground electrode 15b is located in the combustion chamber 20.

The cylinder head 22 is formed with an intake port 25 and an exhaust port 26 for each cylinder 24. The intake port 25 is provided with an intake valve 27 for opening and closing the intake port 25 and an injector 29 for injecting fuel. On the other hand, the exhaust port 26 is provided with an exhaust valve 28 for opening and closing the exhaust port 26.

In the internal combustion engine 10, the intake port 25 is designed to produce a strong tumble flow 35 in the combustion chamber 20. The tumble flow 35 corresponds to a predetermined gas flow 35 produced in the internal combustion engine 10. In the combustion chamber 20, fuel air mixture that has entered in from the intake port 25 flows toward a side of the exhaust port 26 along a ceiling surface of the combustion chamber 20 (a surface of the cylinder head 22 exposed to the combustion chamber 20), and the flow rotates in a vertical direction along a wall surface of the cylinder 24 and a top surface of the piston 23. The tumble flow 35 is produced during an intake stroke and a compression stroke.

<Discharge Device>

Figure 2:
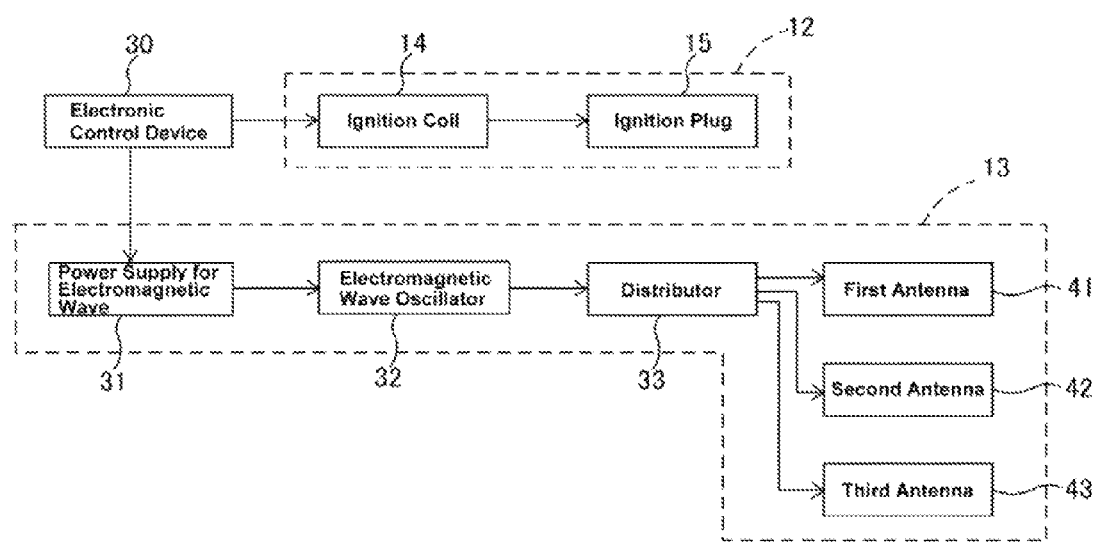
FIG. 2 is a block diagram of a discharge device and an electromagnetic wave emission device according to the embodiment.

The discharge device 12 is provided in association with each combustion chamber 20. As shown in FIG. 2, the discharge device 12 includes an ignition coil (a pulse output part) 14 that outputs a high voltage pulse, and an ignition plug (a discharge generation part) 15 that discharges when applied with the high voltage pulse from the ignition coil 14.

The ignition coil 14 is connected to a direct current power supply (not shown) such as a battery of a vehicle. The ignition coil 14, upon receiving an ignition signal from the electronic control device 30, boosts a voltage applied from the direct current power supply, and outputs the boosted high voltage pulse to the ignition plug 15. The ignition plug 15, upon application of the high voltage pulse, causes insulation breakage at the discharge gap so as to cause a spark discharge. The spark discharge generates discharge plasma 36.

Figure 3:
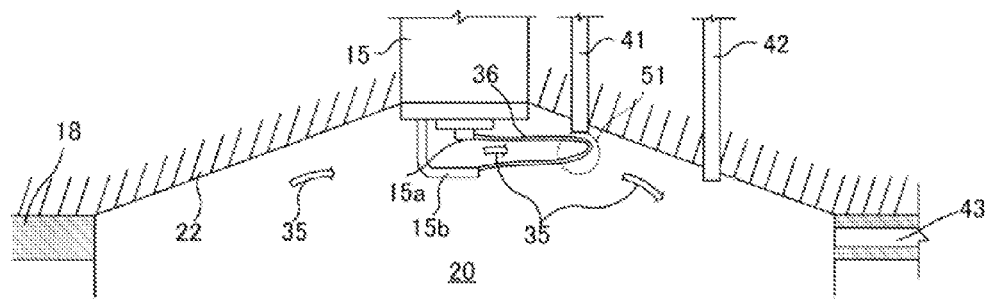
FIG. 3 is a schematic configuration diagram of a relevant part of the internal combustion engine according to the embodiment, FIG. 3a showing a first antenna emitting a microwave, FIG. 3b showing a second antenna emitting a microwave, and FIG. 3c showing a third antenna emitting a microwave.
Figure 3:
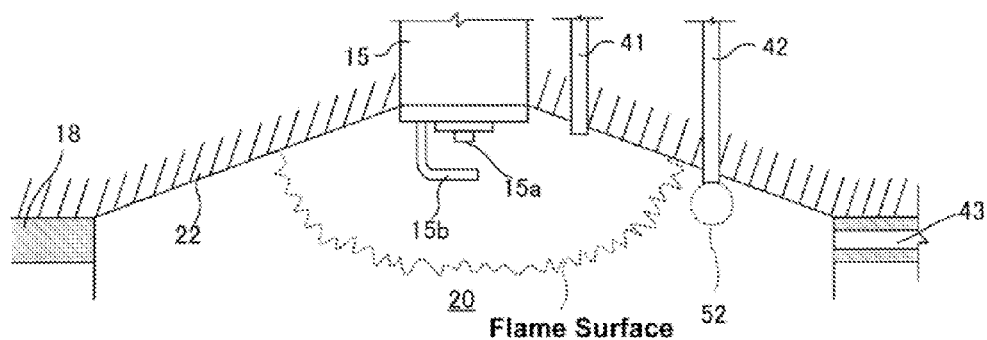
Figure 3:
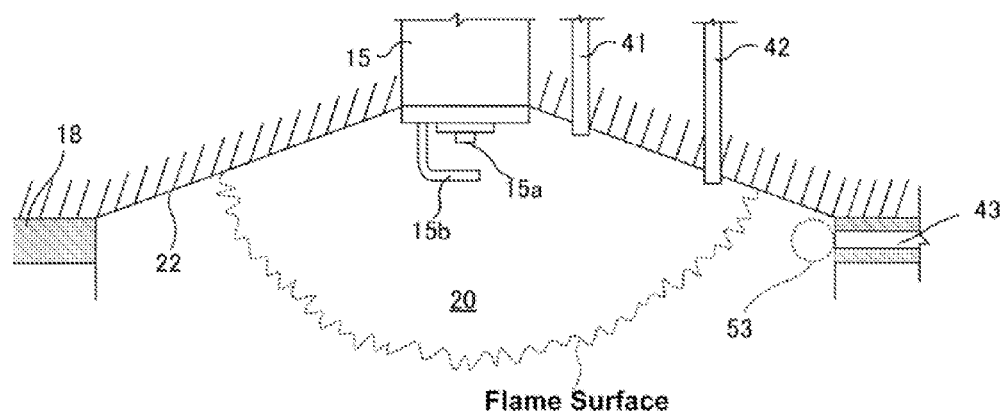

As described above, the strong tumble flow 35 is formed during the intake stroke and the compression stroke in the combustion chamber 20, as shown in FIG. 3. At an ignition timing when the piston 23 is located before a compression top dead center, a bulk flow of the fuel air mixture at the discharge gap flows from a side of the intake port 25 to the side of the exhaust port 26 under influence of the tumble flow 35. As a result of this, the discharge plasma 36 generated by the spark discharge is drifted toward the side of the exhaust port 26. The discharge plasma 36 is stretched due to the gas flow 35.

Figure 4:
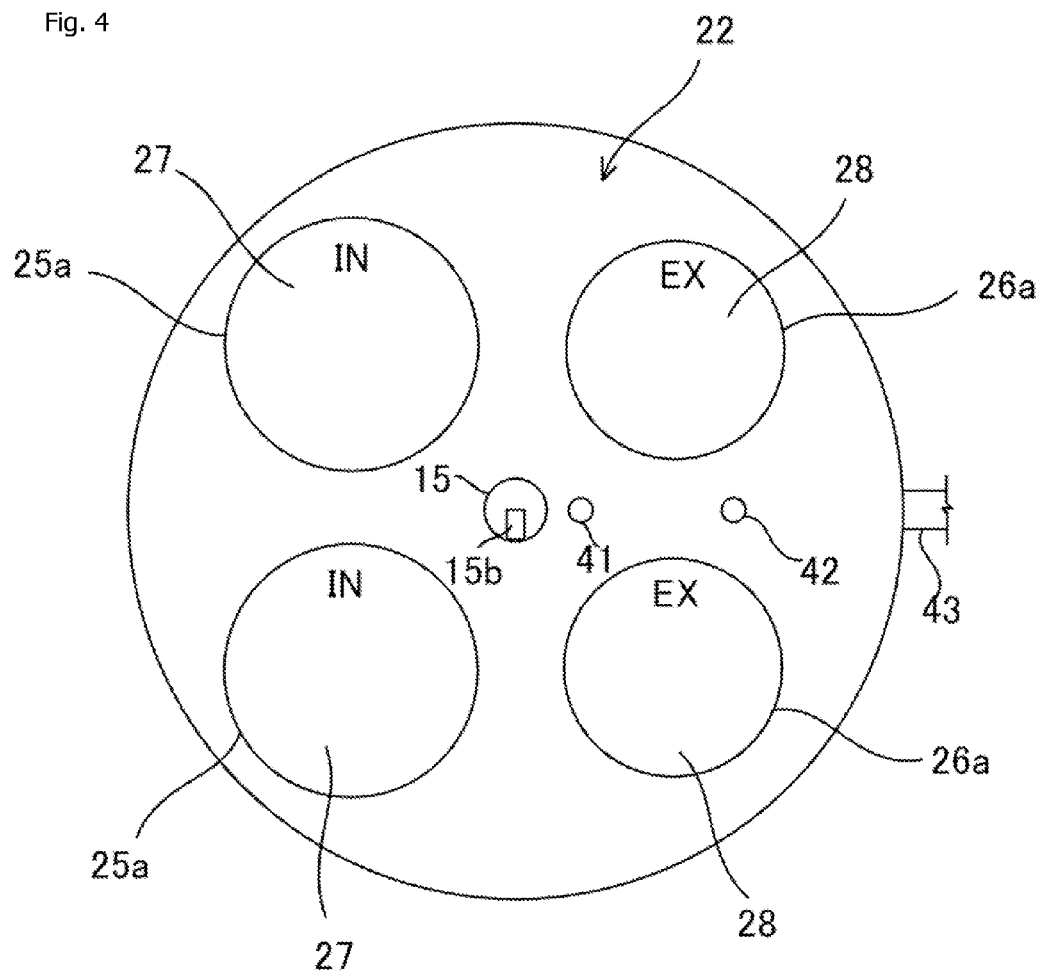
FIG. 4 is a front view of a ceiling surface of a combustion chamber of the internal combustion engine according to the embodiment.

According to the present embodiment, as shown in FIG. 4, a connecting part of the ground electrode 15b extending in an axial direction of the ignition plug 15 (a base end side part of the ground electrode 15b) is located on aside of a middle region between an opening part 25a of the intake port 25 and an opening part 26a of the exhaust port 26. As a result of this, the gas flow 35 at the discharge gap is hardly influenced by the connecting part. The gas flow 35 at the discharge gap is directed approximately toward a midpoint between the opening parts 26a of the two exhaust ports 26. Therefore, the discharge plasma 36 is drifted approximately toward the midpoint between the opening parts 26a of the two exhaust ports 26. The discharge plasma 36 is drifted due to the tumble flow 35 toward a side of a first antenna 41, which will be described later.

<Electromagnetic Wave Emission Device>

The electromagnetic wave emission device 13 constitutes an active species generation unit that generates active species by generating electromagnetic wave plasma in a region which a flame surface has not yet reached during a flame propagation in the combustion chamber 20. As shown in FIG. 2, the electromagnetic wave emission device 13 includes a power supply for electromagnetic wave 31, an electromagnetic wave oscillator 32, a distributor 33, and a plurality of antennae 41 to 43. According to the present embodiment, three antennae 41 to 43 are provided for each combustion chamber 20. FIG. 2 shows only the antennae 41 to 43 corresponding to one combustion chamber 20.

The power supply for electromagnetic wave 31, upon receiving an electromagnetic wave drive signal from the electronic control device 30, supplies a pulse current to the electromagnetic wave oscillator 32. The electromagnetic wave drive signal is a pulse signal. The power supply for electromagnetic wave 31 outputs the pulse current at a predetermined duty cycle during a time period starting from a rise timing of the electromagnetic wave drive signal until a fall timing thereof. The pulse current is continuously outputted during a time period of a pulse width of the electromagnetic wave drive signal.

The electromagnetic wave oscillator 32 is, for example, a magnetron. The electromagnetic wave oscillator 32, upon receiving the pulse current, outputs a microwave pulse. The electromagnetic wave oscillator 32 continuously outputs the microwave pulse during the time period of the pulse width of the electromagnetic wave drive signal. In place of the magnetron, other types of oscillators such as a semiconductor oscillator may be employed as the electromagnetic wave oscillator 32.

The distributor 33 switches the antenna to be supplied with the microwave outputted from the electromagnetic wave oscillator 32, from among the three antennae 41 to 43. The distributor 33, upon receiving a distribution signal from the electronic control device 30, supplies the microwave to the three antennae 41 to 43 one after another in turn.

As shown in FIG. 3, the three antennae 41 to 43 consist of the first antenna 41, a second antenna 42, and a third antenna 43 from a side of the ignition plug 15. Each of antennae 41 to 43 is, for example, a monopole antenna. A tip end of each antenna 41 to 43 serves as an emitting position (a radiating position) of the microwave.

The first and second antennae 41 and 42 are embedded in the cylinder head 22. Emitting ends for microwave (tip ends) of the first and second antennae 41 and 42 are slightly protruded from a surface of the cylinder head 22 (the ceiling surface of the combustion chamber 20). As shown in FIG. 4, the emitting ends of the first and second antennae 41 and 42 are located in a middle region between the opening parts 26a of the two exhaust ports 26. The emitting ends of the first and second antennae 41 and 42 are arranged along a radial direction of the combustion chamber 20.

The third antenna 43 is embedded in the gasket 18, and approximately flush with an inner periphery surface of the gasket 18 at an emitting end for microwave thereof. The third antenna 43 is further away from the discharge device 12 than the first and second antennae 41 and 42.

An input end (a base end) of each antenna 41 to 43 is connected to the distributor 33. From the emitting end of each antenna 41 to 43, the microwave supplied from the distributor 33 is emitted to the combustion chamber 20.

According to the present embodiment, during an ignition operation, which will be described later, the emitting end of the first antenna 41 is located downstream of the discharge gap in the direction of the gas flow 35 at the discharge gap so that the discharge plasma 36 that has been drifted due to the tumble flow 35 is irradiated with the microwave. The emitting end of the first antenna 41 is located in the vicinity of the ignition plug 15 on the ceiling surface of the combustion chamber 20. The emitting end of the first antenna 41 faces toward a flexure part of the discharge plasma 36 (a part that has been most drifted away by the tumble flow 35), which is located furthest away from the discharge gap. Here, the emitting end of the first antenna 41 faces toward the flexure part of the discharge plasma 36 throughout an entire operating range to generate the microwave plasma during the ignition operation.

According to the present embodiment, the second and third antennae 42 and 43 are disposed on the same side as the first antenna 41 in relation to the ignition plug 15. However, the second and third antennae 42 and 43 may be disposed on a side opposite to the first antenna 41 in relation to the ignition plug 15.

<Ignition Operation>

The ignition operation of the fuel air mixture performed by the discharge device 12 and the electromagnetic wave emission device 13 will be described hereinafter. During the ignition operation, a discharge operation of the discharge device 12 for generating the discharge plasma 36 and an emission operation for emitting the microwave from the first antenna 41 by driving the electromagnetic wave oscillator 32 are simultaneously performed so that the discharge plasma 36 is supplied with energy of the microwave, thereby igniting the fuel air mixture in the combustion chamber 20.

During the ignition operation, the electronic control device 30 outputs the ignition signal and the electromagnetic wave drive signal. Then, in the discharge device 12, the ignition coil 14 outputs the high voltage pulse at a falling timing of the ignition signal, and the spark discharge is caused at the ignition plug 15. On the other hand, in the electromagnetic wave emission device 13, the power supply for electromagnetic wave 31 continuously outputs the pulse current during the period starting from the rise timing of the electromagnetic wave drive signal until the fall timing thereof. Subsequently, the electromagnetic wave oscillator 32, upon receiving the pulse current, continuously oscillates the microwave pulse and outputs it to the distributor 33. Owing to an operation delay of the magnetron 32, a start and end of an oscillation period of the microwave slightly delay in relation to a start and end of an output period of the pulse current.

Figure 5:
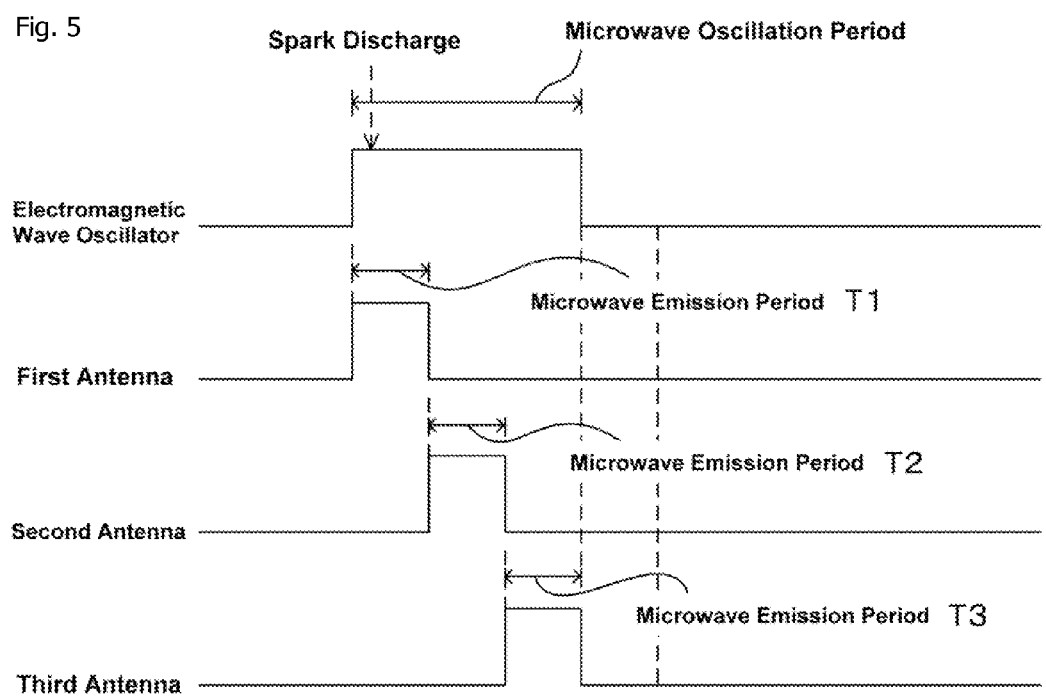
FIG. 5 is a time chart illustrating microwave emission periods from respective antennae and the like in the embodiment.

During the ignition operation, the ignition signal and the electromagnetic wave drive signal are outputted so that the spark discharge is caused immediately after the start of the oscillation period of the microwave, as shown in FIG. 5. During the oscillation period of the microwave, firstly, the distributor 33 sets the first antenna 41 to be a supply destination of the microwave pulse. The microwave is emitted from the first antenna 41 to the combustion chamber 20. At a timing when the spark discharge is caused, a strong electric field region 51, which has an electric field relatively strong in intensity in the combustion chamber 20, is formed in the vicinity of the emitting end of the first antenna 41. As shown in FIG. 3*a*, the discharge plasma 36 caused by the spark discharge is drifted owing to the strong tumble flow 35 toward the side of the exhaust ports 26, and the flexure part thereof enters into the strong electric field region 51. The flexure part of the discharge plasma 36 is irradiated with the microwave. The discharge plasma 36 absorbs the energy of the microwave and thickens. Thus, relatively large scale microwave plasma is formed in the strong electric field region 51. In the strong electric field region 51, the fuel air mixture in the combustion chamber 20 is volume ignited due to the microwave plasma. Subsequently, a flame surface expands outwardly from an ignition location toward the wall surface of the cylinder 24.

<Flame Propagation Promotion Operation>

In a combustion cycle, a flame propagation promotion operation for increasing a flame propagation speed is performed during the flame propagation following the ignition operation.

According to the present embodiment, as the flame propagation promotion operation, a first operation and a second operation are performed. During the first and second operations in series, the supply destination of the microwave is switched from the first antenna 41 to the second antenna 42 and the third antenna 43 one after another in turn. The pulse width of the electromagnetic wave drive signal is configured so that the microwave pulse is continuously outputted until immediately after the flame surface reaches the wall surface of the cylinder 24.

During the first operation, the electronic control device 30 outputs a first distribution signal immediately before the flame surface reaches the emitting end of the second antenna 42. For example, the first distribution signal is outputted at a timing when the flame surface passes through approximately a midpoint between the first and second antennae 41 and 42. The distributor 33, upon receiving the first distribution signal, switches the supply destination of the microwave to the second antenna 42. Then, as shown in FIG. 3*b*, the microwave is emitted from the second antenna 42 to the combustion chamber 20, and a strong electric field region 52 is formed in the vicinity of the emitting end of the second antenna 42. From the second antenna 42, the microwave is emitted until immediately after the flame surface has passed through the strong electric field region 52.

In the strong electric field region 52, for example, free electrons discharged from the flame are accelerated. The accelerated free electrons collide with ambient gas molecules. The collision gas molecules are ionized. Also, free electrons discharged due to the ionization of the gas molecules are accelerated in the strong electric field region 52, and ambient gas molecules are ionized. In this manner, an avalanche-like gas molecule ionization occurs, and the microwave plasma is generated, in the strong electric field region 52.

In the strong electric field region 52, active species (such as OH radical) having strong oxidation power are generated by the microwave plasma. According to the present embodiment, during the flame propagation after the fuel air mixture has been ignited, the active species are generated in the region which the flame surface has not yet reached. The flame surface passes through the region in which the active species are generated. Therefore, oxidation reaction in the flame surface is promoted by the active species, and the flame propagation speed is increased. Also, since the microwave plasma in the strong electric field region 52 is brought into contact with the flame surface of weakly ionized plasma, the flame surface is supplied with the energy of the microwave, thereby also increasing the flame propagation speed.

Then, in the second operation, the electronic control device 30 outputs a second distribution signal immediately before the flame surface reaches the emitting end of the third antenna 43. For example, the second distribution signal is outputted at a timing when the flame surface passes through approximately a midpoint between the second and third antennae 42 and 43. The distributor 33, upon receiving the second distribution signal, switches the supply destination of the microwave to the third antenna 43. Subsequently, as shown in FIG. 3c, a strong electric field region 53 is formed in the vicinity of the emitting end of the third antenna 43. In the strong electric field region 53, the microwave plasma is generated. During the second operation, similarly to the first operation, the microwave plasma is generated in the region which the flame surface has not yet reached, and the flame propagation speed is increased by the microwave plasma.

Effect of Embodiment

According to the present embodiment, it is configured such that the active species are generated in the region which the flame surface has not yet reached so that the flame surface passes through the region in which the active species has been generated. Accordingly, oxidation reaction in the flame surface is promoted owing to the active species, and it is possible to improve the propagation speed of the flame surface.

First Modified Example of Embodiment

Figure 6:
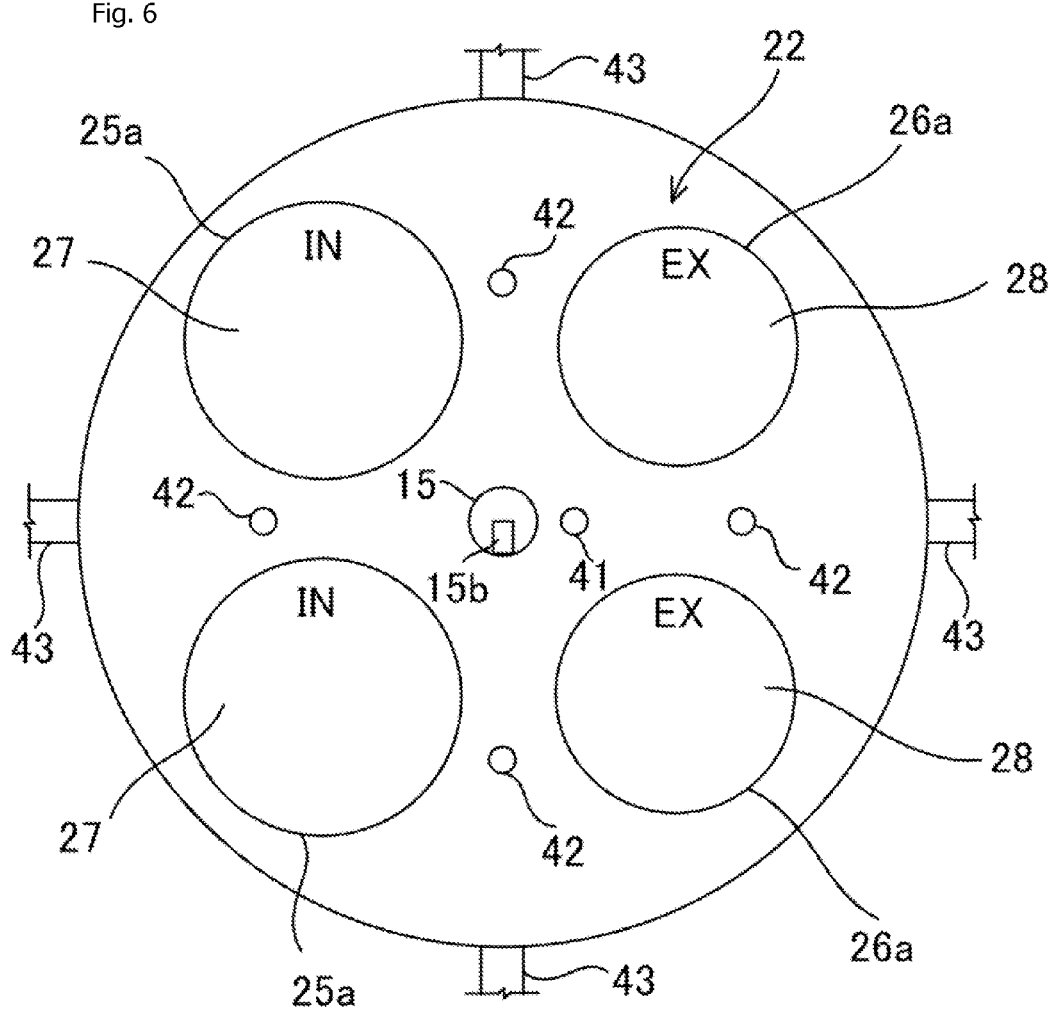
FIG. 6 is a front view of a ceiling surface of a combustion chamber of an internal combustion engine according to a first modified example of the embodiment.

According to the first modified example, as shown in FIG. 6, four antenna groups are provided. The number of antenna groups corresponds to the number of regions defined between adjacent opening parts selected from among the opening parts 25a and 26a of the intake and exhaust ports 25 and 26.

A first antenna group (an antenna group on a right side of the ignition plug 15 in FIG. 6) is constituted by a first antenna 41, a second antenna 42, and a third antenna 43. Each of the remaining second to fourth antenna groups is constituted by a second antenna 42 and a third antenna 43. The electromagnetic wave emission device 13 is provided with an electromagnetic wave unit including a power supply for electromagnetic wave 31, an electromagnetic wave oscillator 32, and a distributor 33 for each antenna group.

The first antenna 41 is supplied with a microwave at the same timing as the first antenna 41 of the embodiment described above. Each second antenna 42 is away from the ignition plug 15 at the same distance as the second antenna 42 of the embodiment described above, and supplied with a microwave at the same timing as the second antenna 42 of the embodiment described above. Each third antenna 43 is embedded in the gasket 18 similarly to the third antenna 43 of the embodiment described above, and supplied with a microwave at the same timing as the third antenna 43 of the embodiment described above.

According to the first modified example, after the fuel air mixture has been ignited by supplying the discharge plasma 36 with energy of the microwave emitted from the first antenna 41, a piece of microwave plasma is generated by the microwave emitted from each second antenna 42, and then, another piece of microwave plasma is generated by the microwave emitted from each third antenna 43. The flame propagation speed is increased owing to the respective pieces of microwave plasma thus generated.

Second Modified Example of Embodiment

Figure 7:
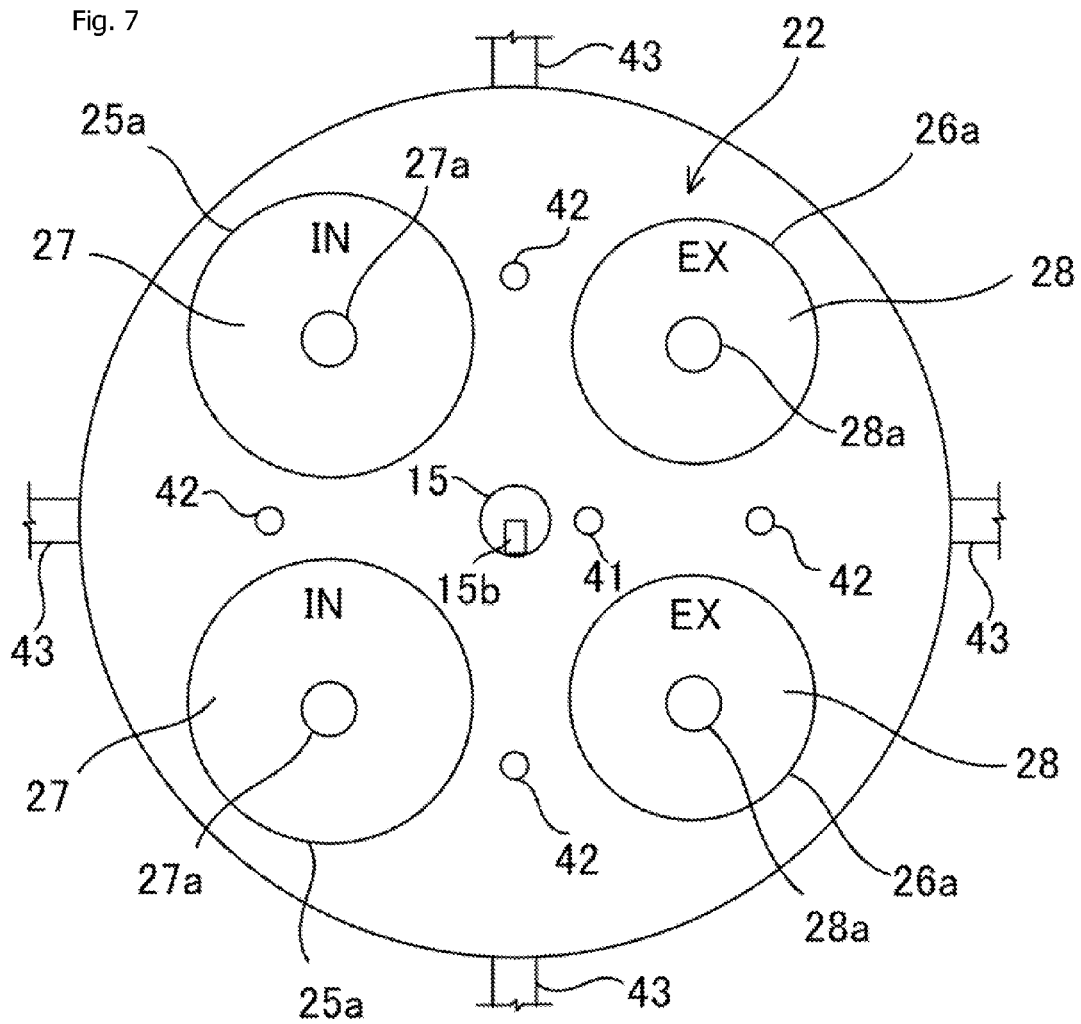
FIG. 7 is a front view of a ceiling surface of a combustion chamber of an internal combustion engine according to a second modified example of the embodiment.

According to the second modified example, as shown in FIG. 7, antennae 27a and 28a are provided on front surfaces (surfaces on a side of the combustion chamber 20) of respective valve heads of the intake and exhaust valves 27 and 28 as antennae for supplying microwaves to respective regions which the flame surface has not yet reached, similarly to the second antennae 42 and the third antennae 43. Transmission lines connecting to antennae 27a and 28a are provided in respective valve shafts. The microwave outputted from the electromagnetic wave oscillator 32 is supplied to the transmission line byway of non-contact power feeding.

Third Modified Example of Embodiment

Figure 8:
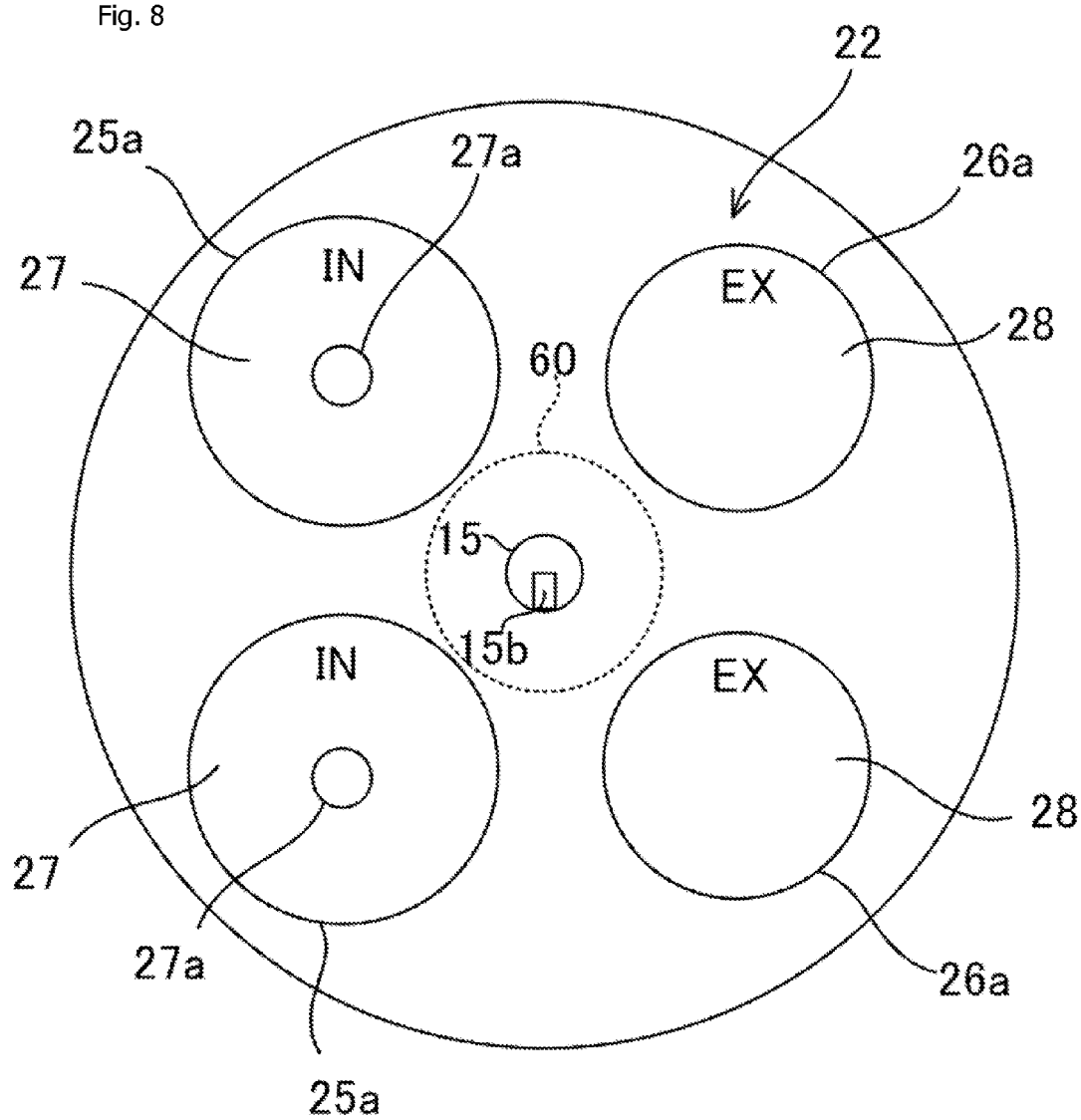
FIG. 8 is a front view of a ceiling surface of a combustion chamber of an internal combustion engine according to a third modified example of the embodiment.

According to the third modified example, as shown in FIG. 8, unlike the second modified example, the antenna 28a is not provided on the front surface of the valve head of each exhaust valve 28, but only the antenna 27a is provided on the front surface of the valve head of each intake valve 27.

In a case in which, in the vicinity of the ceiling surface of the combustion chamber 20, the bulk flow of the fuel air mixture flows from the side of the intake port 25 to the side of the exhaust port 26 owing to the tumble flow 35, the speed of flame propagation after the ignition operation, on the side of the intake port 25 is slow in comparison with that on the side of the exhaust port 26. According to the third modified example, the electromagnetic wave emission device 13 generates electromagnetic wave plasma by emitting an electromagnetic wave from the antenna 27a on the valve head of the intake valve 27 while the flame surface has not yet reached the antenna 27a. As a result of this, a speed of the flame surface passing through a region in the vicinity of the antenna 27a is increased due to the active species generated by the electromagnetic wave plasma.

According to the third modified example, within a space outside of a central part 60 of the combustion chamber 20, the active species are generated in a region, to which the flame surface reaches at a relatively late timing, on the side of the intake port 25 while the flame surface has not yet reached to the region. As a result of this, since oxidation reaction is promoted on the flame surface that passes through the region on the side of the intake port 25, it is possible to ensure a uniform diffusion state of the flame in the combustion chamber 20, seen from the central part 60 of the combustion chamber 20.

Fourth Modified Example of Embodiment

Figure 9:
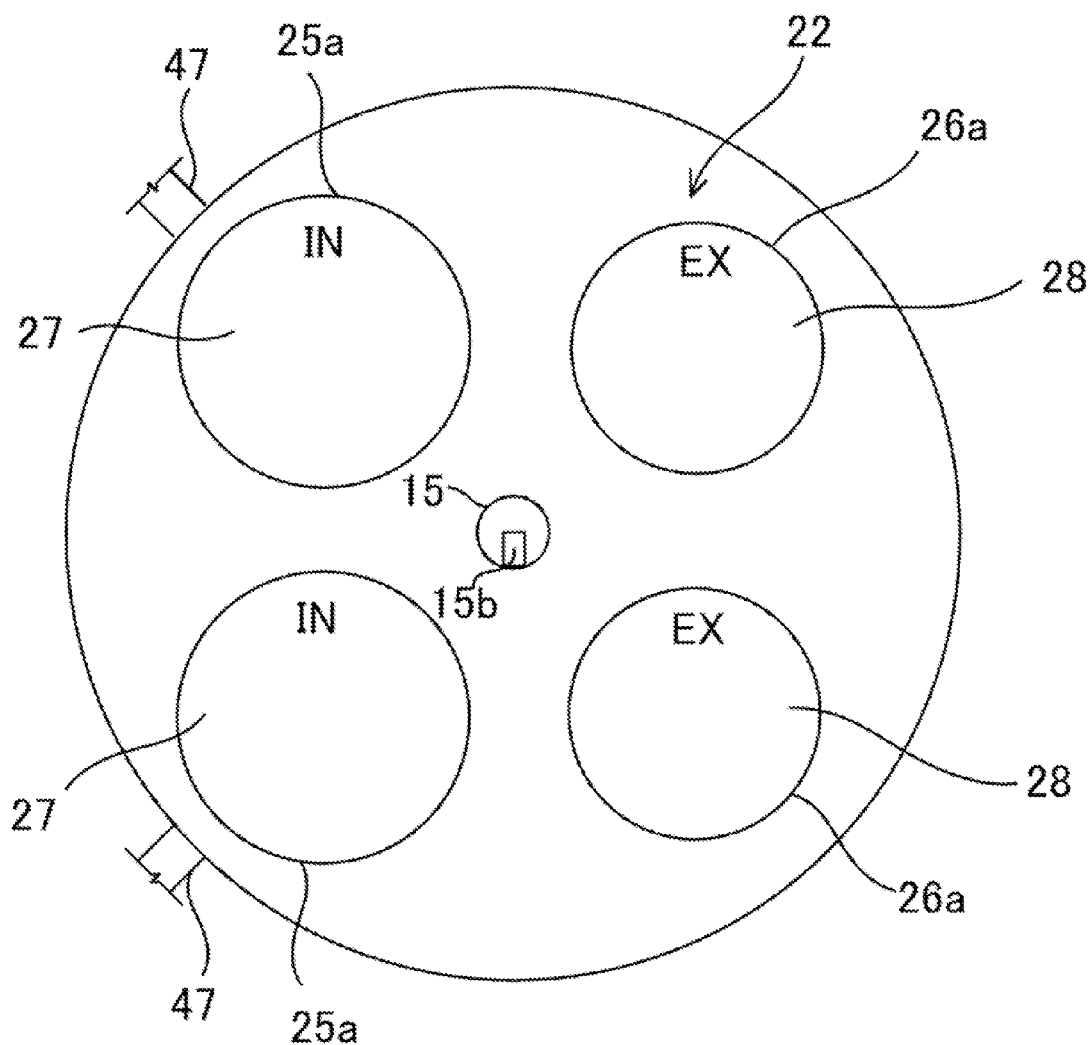
FIG. 9 is a front view of a ceiling surface of a combustion chamber of an internal combustion engine according to a fourth modified example of the embodiment.

According to the fourth modified example, an emitting position of an antenna 47 for supplying a microwave to the region which the flame surface has not yet reached, similarly to the second antenna 42 and the third antenna 43 of the embodiment described above, is located at a region where occurrence frequency of knocking is relatively high in the combustion chamber 20. For example, the emitting position of the antenna 47 is located outward of the opening part 25a of the intake port 25, as shown in FIG. 9. The antenna 47 is embedded in the gasket 18.

In the combustion chamber 20, microwave plasma is generated in a region where occurrence frequency of knocking is relatively high while the flame surface has not yet reached the region, and active species are generated accompanied with the generation of the microwave plasma. According to the fourth modified example, since the active species are generated in a region where knocking is likely to be caused, slowdown of the flame surface is suppressed before the flame surface reaches the region. Accordingly, since it is possible to cause the flame to reach the region where knocking is likely to be caused before knocking occurs, it is possible to suppress the occurrence of knocking.

The internal combustion engine 10 may include a knocking sensor (a knocking detection unit) that detects an occurrence of knocking in the combustion chamber 20. In this case, only when the knocking sensor has detected that knocking has occurred, the electromagnetic wave emission device 13 generates the microwave plasma and the active species by emitting the microwave from the antenna 47 while the flame surface has not yet reached the antenna 47. In a combustion cycle immediately after knocking has occurred, slowdown of the flame surface is suppressed before the flame surface reaches the region where knocking has occurred. Accordingly, it is possible to suppress a consecutive occurrence of knocking.

Fifth Modified Example of Embodiment

Figure 10:
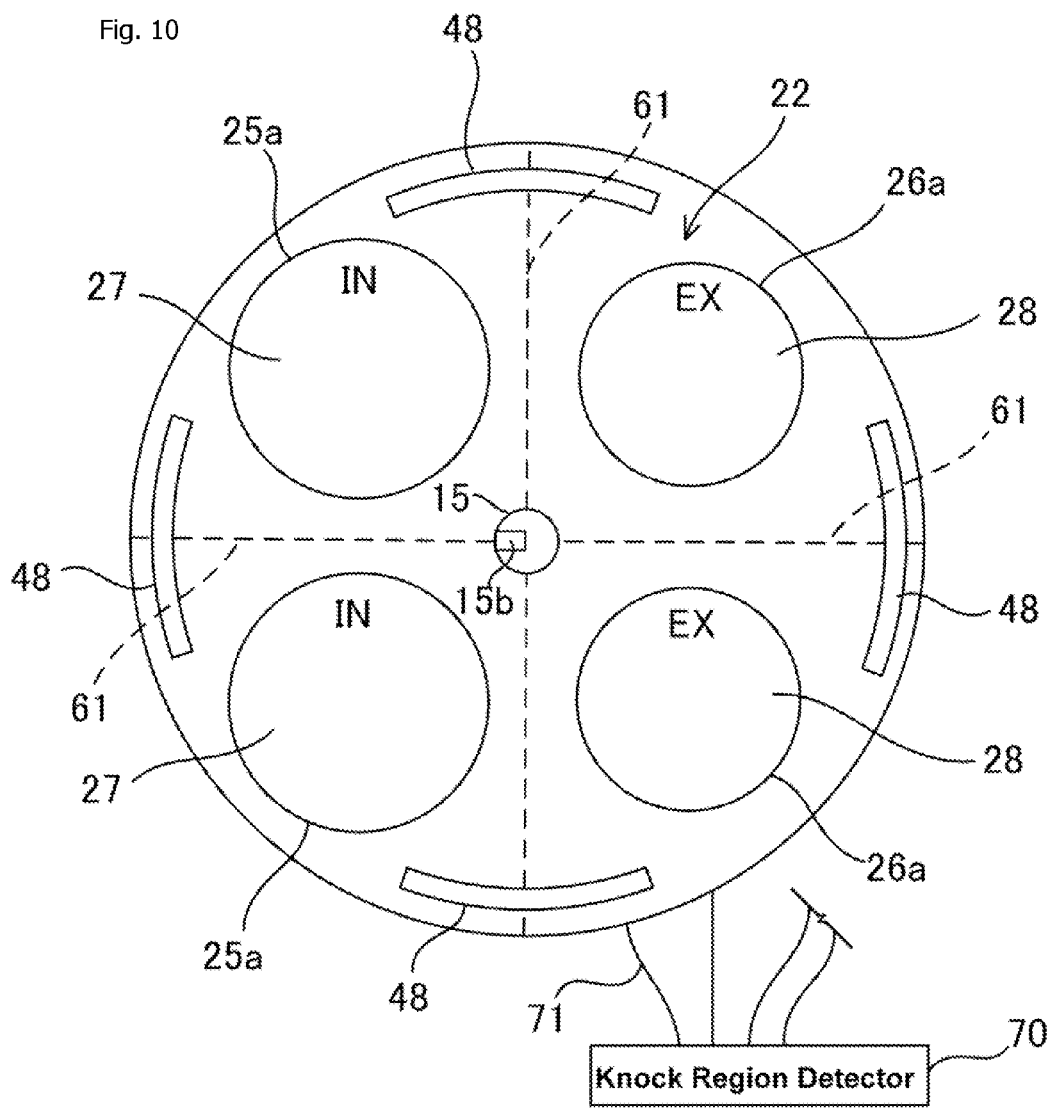
FIG. 10 is a schematic configuration diagram of a relevant part of an Internal combustion engine according to a fifth modified example of the embodiment.

According to the fifth modified example, an antenna 48 for generating microwave plasma in a region where knocking has occurred is stretched along an outer peripheral part of the ceiling surface of the combustion chamber 20, as shown in FIG. 10. Four antennae 48 are provided. Each antenna 48 extends from each radial line 61 toward both sides thereof along the outer periphery of the ceiling surface wherein each radial line 61 extends between two adjacent opening parts selected from among the opening parts 25a and 26a of the intake and exhaust ports 25 and 26 in a radial direction of the ceiling surface of the combustion chamber 20.

The internal combustion engine 10 is provided with a knock region detector 70 (a knock region detection unit) that detects a region where knocking has occurred (hereinafter, referred to as a "knocking occurrence region") in a case in which knocking has occurred in the combustion chamber 20. For example, the knock region detector 70 acquires lights emitted from a plurality of locations in the outer peripheral part of the combustion chamber 20 via a plurality of optical fibers 71 so as to detect a region, in which the intensity of the emitted light of a wavelength band corresponding to OH radical exceeds a predetermined threshold value, and determines the region thus detected as the knocking occurrence region. The knocking occurrence region is determined in this manner because of the fact that the intensity of the light emitted from OH radical increases rapidly as a result of an occurrence of knocking.

The electromagnetic wave emission device 13 emits the microwave from the antenna 48 located in a knocking occurrence region (hereinafter, referred to as an "occurrence side antenna 48") while the flame surface has not yet reached the occurrence side antenna 48 during a combustion cycle immediately after the knock region detector 70 has detected that knocking has occurred. In the vicinity of the occurrence side antenna 48, active species are generated along with the generation of the microwave plasma. Accordingly, it is possible to suppress the slowdown of the flame before the flame reaches the vicinity of the occurrence side antenna 48 so as to prevent an occurrence of knocking in the combustion cycle, and thus to suppress a consecutive occurrence of knocking.

Sixth Modified Example of Embodiment

Figure 11:
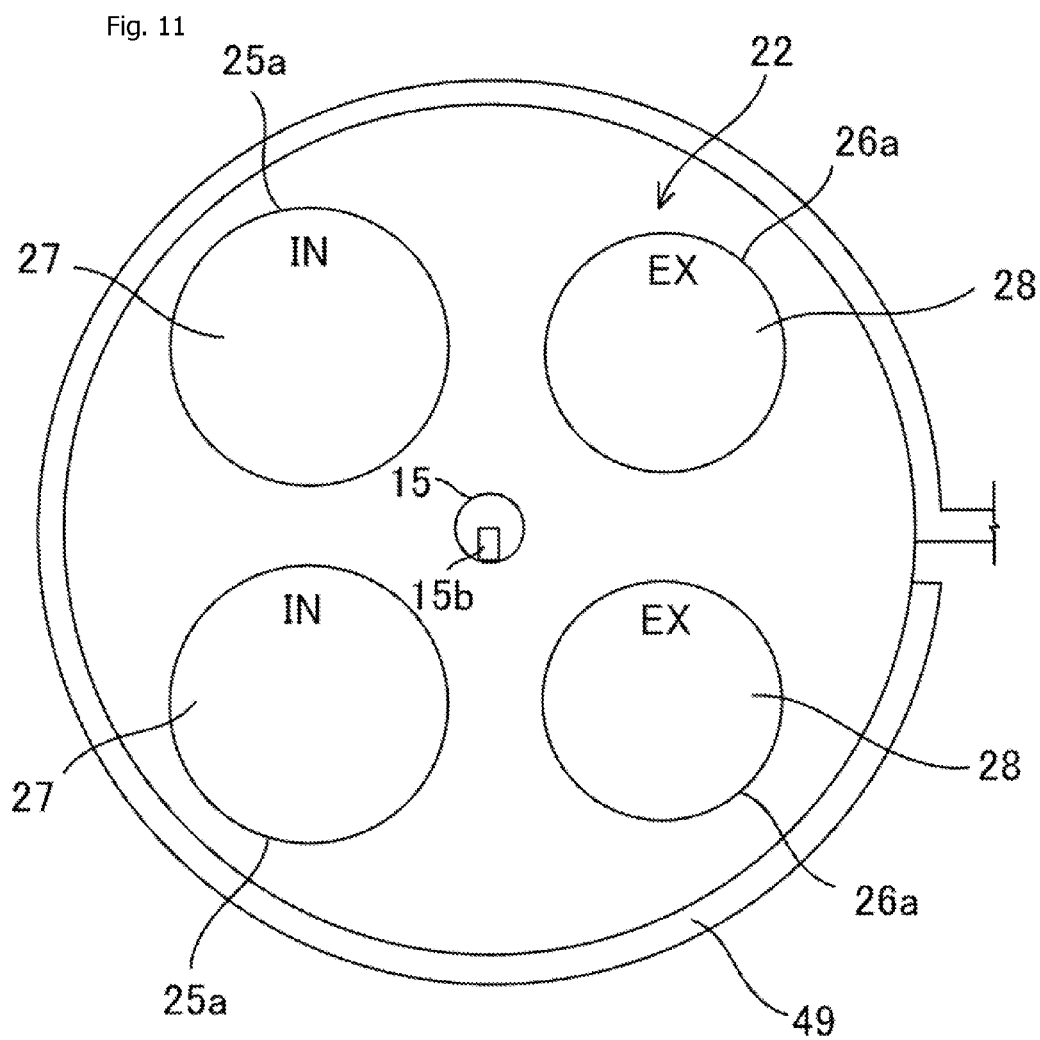
FIG. 11 is a schematic configuration diagram of a relevant part of an internal combustion engine according to a sixth modified example of the embodiment.

According to the sixth modified example, similarly to the fifth modified example, an antenna 49 for generating microwave plasma in the knocking occurrence region extends along an approximately entire circumference of the ceiling surface of the combustion chamber 20, as shown in FIG. 11. The antenna 49 is embedded in the gasket 18.

The electromagnetic wave emission device 13 includes an electric field adjuster that changes a location of a strong electric field region, which has an electric field relatively strong in intensity, on a surface of the antenna 49. The electric field adjuster is, for example, a stub tuner that is capable of adjusting impedance of a transmission line of the microwave. The stub tuner is configured to be capable of changing an operable length as a stub by adjusting a location at which the stub is short circuited to the ground, for example.

The electromagnetic wave emission device 13 causes the electric field adjuster to adjust so that the strong electric field region is located in or in the vicinity of the knocking occurrence region based on a detection result of the knock region detector 70. Then, microwave plasma is generated in the vicinity of the strong electric field region. As a result of this, the microwave plasma is generated in or in the vicinity of the knocking occurrence region.

Seventh Modified Example of Embodiment

Figure 12:
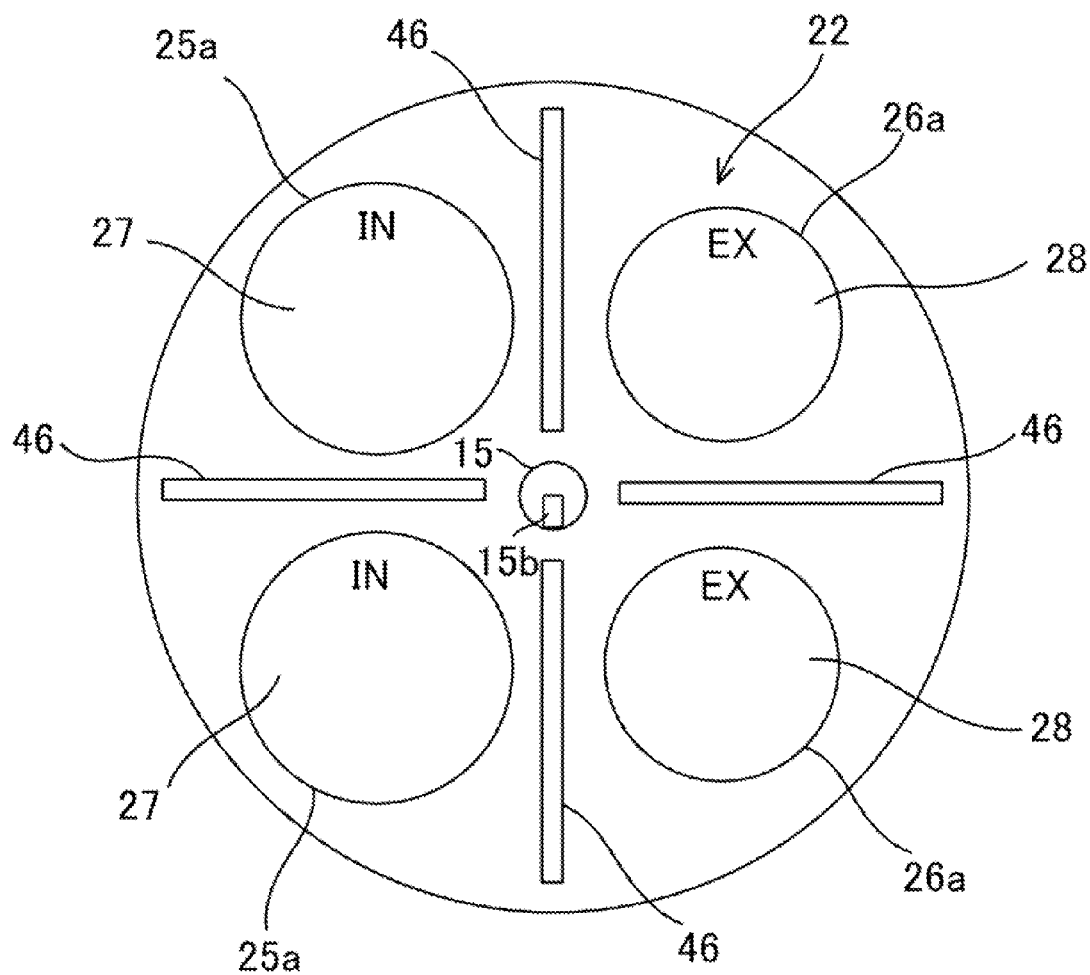
FIG. 12 is a schematic configuration diagram of a relevant part of an internal combustion engine according to a seventh modified example of the embodiment.

According to the seventh modified example, as shown in FIG. 12, in place of the antenna groups of the first modified example, rod shaped antennae 46 are provided. The antennae 46 extend in respective radial directions on the ceiling surface of the combustion chamber 20 along the respective intervening regions between two adjacent opening parts selected from among the opening parts 25a and 26a of the intake and exhaust ports 25 and 26. Each antenna 46 extends from slightly outward of the ignition plug 15 straightforward to the vicinity of the wall surface of the cylinder 24. At least the antenna 46 between the opening parts 26a of the exhaust ports 26 (the antenna on the right side of the ignition plug 15 in FIG. 12) faces toward the flexure part of the discharge plasma 36 at an inner end thereof.

The electromagnetic wave emission device 13 is provided with an electromagnetic wave unit that includes a power supply for electromagnetic wave 31 and an electromagnetic wave oscillator 32 for each antenna 46. Each electromagnetic wave unit, unlike the first modified example, does not include a distributor 33, but instead includes an electric field adjuster that changes a location of a strong electric field region, which has an electric field relatively strong in intensity, on a surface of the antenna 46.

During the ignition operation, each electromagnetic wave unit causes the electric field adjuster to operate so that the strong electric field region is located on an inner end surface of the antenna 46. An emitting position of the antenna 46 between the opening parts 26a of the exhaust ports 26 faces toward the discharge plasma 36 that has been drifted owing to the tumble flow 35. Accordingly, the discharge plasma 36 effectively absorbs the energy of the microwave. As a result of this, the discharge plasma 36 is thickened, and the fuel air mixture is volume ignited.

The microwave is continuously emitted from each antenna 46 during the flame propagation after the fuel air mixture has been ignited. The electric field adjuster moves the emitting position for microwave of each antenna 46 outwardly ahead of the flame surface. The region which the flame surface has not yet reached becomes the strong electric field region. The strong electric field region moves outwardly, and the microwave plasma generated by the strong electric field region also moves outwardly along with the movement of the strong electric field region. As a result of this, the flame surface passes through the region in which the active species has been generated, oxidation reaction on the flame surface is promoted owing to the active species, and thus the flame propagation speed is improved.

Other Embodiments

The embodiment described above may also be configured as follows.

According to the embodiment described above, the internal combustion engine 10 may be an engine that executes diffusion combustion similarly to a diesel engine. The active species generation unit generates the active species in a region while the flame surface generated by injected fuel has not yet reached the region.

Furthermore, in the embodiment described above, the antenna may not be exposed to the combustion chamber 20 and may be covered by an insulator or dielectric material.

INDUSTRIAL APPLICABILITY

The present invention is useful in relation to an internal combustion engine that promotes combustion utilizing active species.

EXPLANATION OF REFERENCE NUMERALS

10 Internal Combustion Engine
11 Internal Combustion Engine Main Body
13 Electromagnetic Wave Emission Device (Active Species Generation Unit)
20 Combustion Chamber
32 Electromagnetic Wave Oscillator
41 First Antenna
42 Second Antenna
43 Third Antenna

What is claimed is:

1. An internal combustion engine comprising:
    a cylinder and a cylinder head that define a combustion chamber;
    a discharge device provided to the cylinder head and configured to generate a flame whose surface propagates in the combustion chamber;
    two gas intake valves and two gas exhaust valves, each valve being provided to the cylinder head;
    an electromagnetic wave oscillator configured to oscillate an electromagnetic wave;
    an antenna provided to the cylinder head at a region radially outward from the discharge device and at the region extending between the two gas exhaust valves, the antenna being configured to supply the electromagnetic wave energy supplied from the electromagnetic wave oscillator to generate active species in the combustion chamber.

2. The internal combustion engine according to claim 1, further comprising a control device configured to control the electromagnetic wave oscillator to generate the active species at said region before the flame surface reaches said region during the frame propagation, thereby promoting the flame propagation in the combustion chamber.

3. The internal combustion engine according to claim 1, further comprising a knocking detection unit that detects an occurrence of knocking in the combustion chamber,
    wherein the control device controls the electromagnetic wave oscillator to generate the active species at said region before the flame surface reaches said region, based on a detection result from the knocking detection unit.

4. The internal combustion engine according to claim 3, wherein the control device controls the electromagnetic wave oscillator to generate the active species at said region before the flame surface reaches said region if the knocking detection unit detects the occurrence of knocking at said region if the knocking detection unit detects the occurrence of knocking in said region.

* * * * *